June 18, 1957 F. GONZALEZ CUESTA 2,796,108
SAFETY PNEUMATIC TIRE WHEEL
Filed Oct. 31, 1952
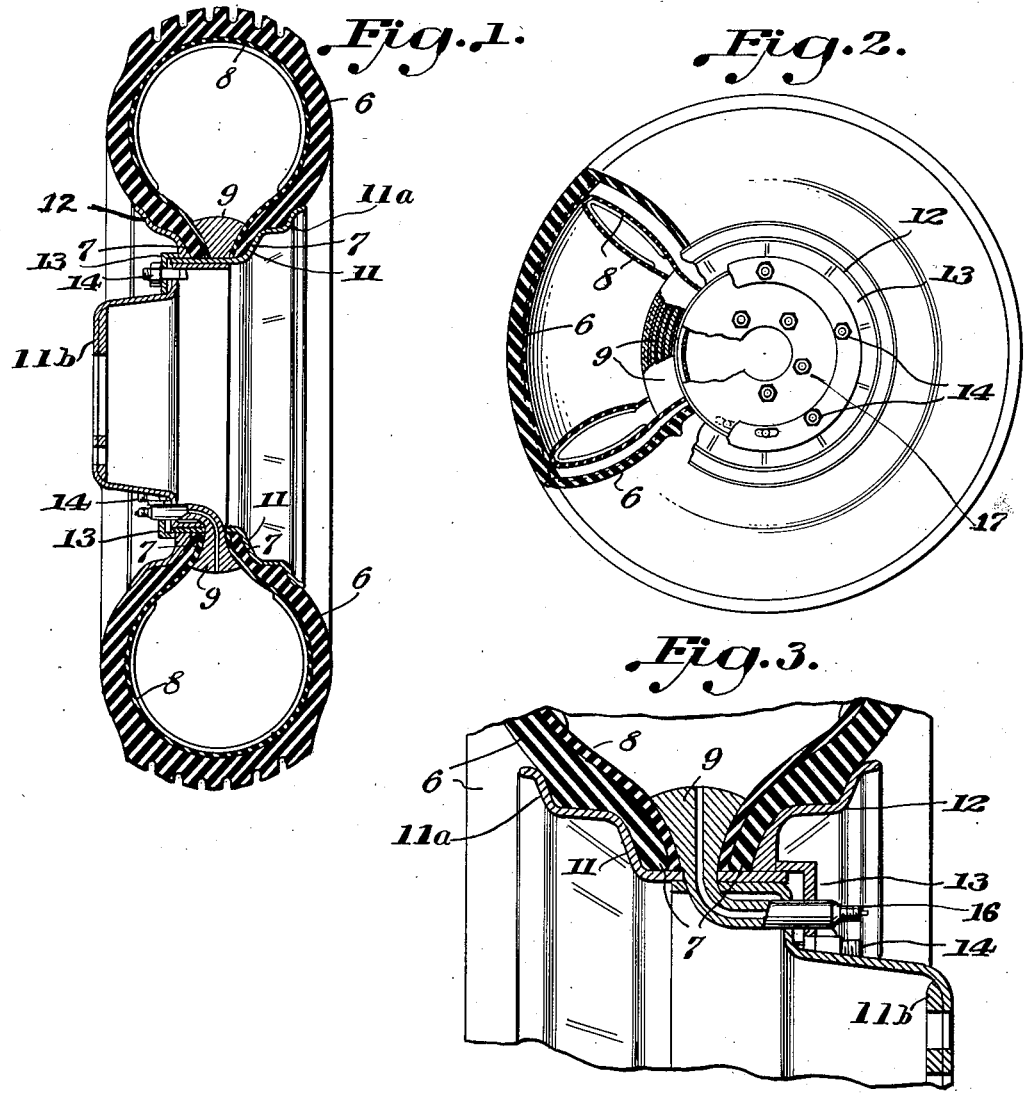
INVENTOR.
FRANCISCO GONZALEZ CUESTA
BY
ATTYS

United States Patent Office 2,796,108
Patented June 18, 1957

2,796,108

SAFETY PNEUMATIC TIRE WHEEL

Francisco Gonzalez Cuesta, San Sebastian, Spain

Application October 31, 1952, Serial No. 318,131

Claims priority, application Spain September 6, 1952

2 Claims. (Cl. 152—346)

The present invention relates to a pneumatic tire construction in which an improved safety rim and clamping ring serve to support a tire of the safety type which is provided with a self-sealing rubber lining of the type which is already known.

The so-called tubeless safety tires of the pneumatic type which have been in use heretofore have been provided with a valve stem and connecting structure integral with the flexible rubber or synthetic rubber lining. Despite the reinforcement which has been provided for the integral connection of the valve stem to the rubber lining, the valve stem connection is subjected to quite a bit of pulling and bending in assembling the lining and tire on the conventional rim and this has caused dissatisfaction to automobile and truck operators. Due to the frequency with which the tires are changed during the ordinary operation of trucks and automobiles and in instances where even wear is desired on the tires in use and on the spare tire, it is desirable to provide a tire construction in which the above mentioned defects concerning the valve stem are avoided.

The present invention provides a new rim and clamping ring construction to permit the assembling of the self-sealing or puncture-proof lining with the valve stem in a separate assembling operation and thereby obviates the disadvantages of the valve stem integral with the lining. Further, the rim and clamping construction of the present invention in the assembled condition provides for a substantially hermetic seal of the lining in the tubeless tire about the rim, the rim further providing for a secure engagement of the tire bead structure because of the projection of the rim beyond the bead and in contact with the side wall of the tire.

An object of the present invention is to provide a rim construction for a tubeless tire of the pneumatic safety type having a self-sealing liner, separate air valve stem and valve which fits into said liner, said rim construction comprising an annular rim member with a bead retaining flange on one edge thereof for supporting the tire bead and tire side wall, said rim having a wheel disc integral therewith provided with apertures for mounting lugs for mounting the wheel to the hub on a vehicle, a removable flange on the edge of said rim opposite said retaining flange to support the inner tire bead and tire side wall, a clamping ring bearing against the lower end of said removable flange and shaped to hermetically seal the tire liner by means of the air-tight facing in contact with said liner and clamping nuts and bolts provided on the wheel disc to secure said clamping ring and rim and removable flange in fluid-tight relation.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

In connection with that more detailed desciption, there is shown in the drawings, in Figure 1 a diametrical section of the rim construction and tire in accordance with the invention;

Figure 2 a plan view which is partly in section and partly in perspective of the consruction shown in Figure 1; and Figure 3 is an enlarged view of a portion of Figure 1.

As is shown in the figures, the tubeless tire 6 having beads or flanges 7 projecting radially inwardly thereon is provided with the self-sealing or puncture-proof liner 8 and seal 9, and is mounted on a wheel construction which comprises an annular rim 11 having on one edge thereof a bead retaining flange 11a extending generally radially outwardly for supporting the tire bead and the tire side wall. Integrally attached to annular rim 11 is a wheel disc member 11b having a series of circumferentially spaced apertures therein to fit over lugs 17 on the hub (not shown) to mount the wheel on the vehicle. An annular removable flange 12 is provided on the end of the rim opposite the bead supporting flange 11a, and is slidable on the rim 11. The removable flange serves to support the other tire bead. A clamping ring 13 having a series of apertures thereon and having an L-shaped cross section is provided, and the clamping ring fits over a plurality of circumferentially spaced bolts 14 on the wheel disc with the short leg of the L against the removable flange 12. The clamping ring is secured by means of nuts on the bolts 14.

The valve stem 16 is assembled in the seal 9 as shown in Figures 1 and 3 and the valve stem extends radially inwardly through a hole in rim 11 and is bent outwardly through a hole in the wheel disc 11b to permit inflation of the tire at a point outside of the wheel disc and between the wheel disc and the side wall of the tire. The valve stem is bent outwardly through the wheel disc so that it may be in right angular relationship to the liner as is shown in Figures 1 and 3.

The clamping ring is shown clearly in Figure 3. The annular rim member 11 extends below and in sealing contact with the liner 9 as in Figure 1 and is clamped with clamping ring construction 13 which is a one-piece clamping ring.

In assembling the wheel elements and fitting the tire for service, graphite is applied to the bolts 14 and the surfaces of the rim and flanges which will bear against the tire. Also the opening in the rim 11 and clamping ring 13 for the insertion of the valve stem 16 is graphited. Upon assembly of these foregoing elements, the tire and liner are fitted between the flanges during assembly, the tire and wheel are joined and the tire is ready for inflation. Upon inflating the tire to the desired pressure, the construction is seen to be perfectly air-tight and due to the simplicity of engagement of the flanges and clamping ring, the wheel is sturdy so that it will hold up well under actual severe driving conditions.

The pneumatic force which is exerted against the liner of the tire after inflation seats the bead of the tire securely against the conforming inner surface of the flanges to further contribute to the tightness of the seal. This arrangement obviates pinching of the liner and saves time in the changing of the tire.

The tire is suitable not only for automobiles but for trucks which carry heavy loads. The simplicity of the construction of the flanges and the clamping ring permits these parts to be fabricated readily and cheaply of strong metals such as steel and the tightness of the seal is maintained even under the high pressure which is encountered in truck tires.

A saving of the liner is had by virtue of the rim construction provided and due to the absence of pinching as above noted. The liner may be conveniently recapped and be suitable for continued use in accordance with the present rim construction whereas this advantage is not had with the constructions in the prior art.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawing being merely preferred embodiments thereof.

What is claimed is:

1. A safety pneumatic tire wheel comprising a rim having axially spaced flanges projecting radially outwardly on the ends thereof, one of said flanges being removable from said rim, a clamping ring bearing against said removable flange, a wheel disc to which said rim is integrally attached and having a plurality of nuts and bolts thereon by which said clamping ring is secured against said removable flange, a pneumatic tire having beads thereon projecting radially inwardly from said tire between said flanges, a self-sealing rubber liner in said tire, said beads being spaced axially inwardly from the side walls of said tire, and a seal between said beads having a valve inserted through said seal, said removable flange being clamped against said tire to seal said beads against said seal, whereby when said tire is inflated said beads are held against said flange by the pressure within the tire.

2. A safety pneumatic tire wheel as claimed in claim 1 in which said removable flange is slidable along said rim axially thereof.

References Cited in the file of this patent

UNITED STATES PATENTS

| | | |
|---|---|---|
| 1,403,141 | Worrall | Jan. 10, 1922 |
| 1,591,633 | Lang | July 6, 1926 |
| 1,637,599 | Ballew | Aug. 2, 1927 |
| 1,707,014 | Hopkinson | Mar. 26, 1929 |
| 1,903,575 | Shoemaker | Apr. 11, 1933 |
| 2,339,542 | Hale | Jan. 18, 1944 |
| 2,424,918 | Brown | July 29, 1947 |
| 2,563,787 | Keefe | Aug. 7, 1951 |

FOREIGN PATENTS

| | | |
|---|---|---|
| 101,795 | Great Britain | July 19, 1917 |
| 533,052 | Great Britain | Feb. 5, 1941 |